United States Patent
Baxter et al.

(10) Patent No.: US 10,006,609 B2
(45) Date of Patent: Jun. 26, 2018

(54) PLUG COMPATIBLE LED REPLACEMENT FOR INCANDESCENT LIGHT

(75) Inventors: Kevin C. Baxter, Glendale, CA (US); Fred H. Holmes, Cleveland, OK (US)

(73) Assignee: LITEPANELS, LTD. (GB)

( * ) Notice: Subject to any disclaimer, the term of this patent is extended or adjusted under 35 U.S.C. 154(b) by 63 days.

(21) Appl. No.: 13/442,690

(22) Filed: Apr. 9, 2012

(65) Prior Publication Data

US 2013/0100678 A1   Apr. 25, 2013

Related U.S. Application Data

(60) Provisional application No. 61/473,705, filed on Apr. 8, 2011.

(51) Int. Cl.
*F21V 29/61* (2015.01)
*F21V 13/02* (2006.01)
(Continued)

(52) U.S. Cl.
CPC ............... *F21V 13/02* (2013.01); *F21K 9/23* (2016.08); *F21K 9/69* (2016.08); *F21V 3/00* (2013.01);
(Continued)

(58) Field of Classification Search
CPC .... G03B 15/0442; G03B 15/02; G03B 15/03; G03B 15/06; G03B 2215/056;
(Continued)

(56) References Cited

U.S. PATENT DOCUMENTS 4,546,420 A * 10/1985 Wheeler ............. F21V 23/0442
                                                  362/19
4,692,844 A *  9/1987 Galerne ................. F21V 19/02
                                                  362/268
(Continued)

FOREIGN PATENT DOCUMENTS

DE       202007008430      10/2008
EP           1998108 A1    12/2008
(Continued)

OTHER PUBLICATIONS

European Patent Office PCT International Search Report, International Application No. PCT/US2011/028573, dated Sep. 2, 2011.
(Continued)

*Primary Examiner* — Andrew Coughlin
*Assistant Examiner* — Nathaniel Lee
(74) *Attorney, Agent, or Firm* — Scott R. Zingerman; Gable Gotwals

(57) ABSTRACT

According to an aspect of the instant invention, an LED Engine is provided preferably for use with a Fresnel fixture having a globe socket wherein the LED Engine is plug compatible with the globe socket. A Fresnel lighting fixture generally includes a housing; a Fresnel lens supported from the housing; a focus rail; and a globe socket supported by the focus rail. The globe socket electrically receives a Fresnel globe or bulb. The plug compatible LED Engine of the present disclosure is positionable to be inserted in the globe socket of the existing Fresnel fixture thereby replacing the incandescent bulb. Alternatively, the globe socket may be removed and the LED Engine mounted to the focus rail.

18 Claims, 10 Drawing Sheets

(51) Int. Cl.
    *F21V 3/00*     (2015.01)
    *F21V 29/00*     (2015.01)
    *F21V 5/04*     (2006.01)
    *G03B 15/07*     (2006.01)
    *G02B 19/00*     (2006.01)
    *G02B 3/00*     (2006.01)
    *G02B 3/08*     (2006.01)
    *F21V 29/54*     (2015.01)
    *F21V 29/67*     (2015.01)
    *F21V 29/71*     (2015.01)
    *F21K 9/23*     (2016.01)
    *F21K 9/69*     (2016.01)
    *F21V 14/02*     (2006.01)
    *F21V 21/30*     (2006.01)
    *F21W 131/406*     (2006.01)
    *F21Y 105/10*     (2016.01)
    *F21Y 115/10*     (2016.01)

(52) U.S. Cl.
    CPC ............ *F21V 5/045* (2013.01); *F21V 29/004* (2013.01); *F21V 29/006* (2013.01); *F21V 29/2212* (2013.01); *F21V 29/54* (2015.01); *F21V 29/677* (2015.01); *F21V 29/717* (2015.01); *G02B 3/0056* (2013.01); *G02B 3/08* (2013.01); *G02B 19/0028* (2013.01); *G02B 19/0066* (2013.01); *G03B 15/07* (2013.01); *F21V 21/30* (2013.01); *F21W 2131/406* (2013.01); *F21Y 2105/10* (2016.08); *F21Y 2115/10* (2016.08); *Y10T 29/49* (2015.01); *Y10T 29/49716* (2015.01)

(58) Field of Classification Search
    CPC .... G03B 15/0484; G03B 15/07; G03B 21/20; H04N 5/2256; H04N 5/2354; H04N 5/2252; F21V 15/01; F21V 3/02; F21V 5/045; F21V 23/02; F21V 13/02; F21V 29/54; F21V 29/677; F21V 29/717; F21V 3/00; F21V 29/004; F21V 29/006; F21V 29/2212; F21K 9/00; F21K 9/10; F21K 9/23; F21K 9/69
    USPC ............ 362/3–18, 249.01–249.19, 285–289, 362/311.01–311.15
    See application file for complete search history.

(56) References Cited

U.S. PATENT DOCUMENTS

| | | | |
|---|---|---|---|
| 5,023,709 A | 6/1991 | Kita et al. | |
| 5,895,128 A | 4/1999 | Kishimoto et al. | |
| 6,276,822 B1 * | 8/2001 | Bedrosian | F21S 48/1154 362/545 |
| 6,550,530 B1 * | 4/2003 | Bilski | F28D 15/043 165/104.25 |
| 6,749,310 B2 | 6/2004 | Pohlert et al. | |
| 6,824,283 B2 | 11/2004 | Pohlert et al. | |
| 6,948,823 B2 | 9/2005 | Pohlert et al. | |
| 7,034,470 B2 * | 4/2006 | Cok | H01L 27/3204 315/185 R |
| 7,140,742 B2 | 11/2006 | Pohlert et al. | |
| 7,163,302 B2 | 1/2007 | Pohlert et al. | |
| 7,318,652 B2 | 1/2008 | Pohlert et al. | |
| 7,331,681 B2 | 2/2008 | Pohlert et al. | |
| 7,429,117 B2 | 9/2008 | Pohlert et al. | |
| 7,510,290 B2 | 3/2009 | Pohlert et al. | |
| 7,604,361 B2 | 10/2009 | Pohlert et al. | |
| 7,874,701 B2 | 1/2011 | Pohlert et al. | |
| 7,972,022 B2 | 7/2011 | Pohlert et al. | |
| 8,025,417 B2 | 9/2011 | Pohlert et al. | |
| 8,506,125 B2 | 8/2013 | Pohlert et al. | |
| 8,702,255 B2 | 4/2014 | Baxter et al. | |
| 2001/0033135 A1 * | 10/2001 | Duggal | B82Y 20/00 313/506 |
| 2003/0174209 A1 | 9/2003 | Piazzi et al. | |
| 2004/0120156 A1 | 6/2004 | Ryan | |
| 2005/0057187 A1 * | 3/2005 | Catalano | F21V 23/003 315/291 |
| 2005/0168995 A1 | 8/2005 | Kittelmann et al. | |
| 2005/0207196 A1 | 9/2005 | Holmes et al. | |
| 2005/0210896 A1 * | 9/2005 | Durant | G06F 1/206 62/178 |
| 2007/0019415 A1 | 1/2007 | Leblanc et al. | |
| 2007/0159817 A1 | 7/2007 | Evans et al. | |
| 2007/0189013 A1 | 8/2007 | Ford | |
| 2007/0228835 A1 | 10/2007 | Varzhabedian | |
| 2007/0236344 A1 | 10/2007 | Desrosiers et al. | |
| 2008/0062694 A1 | 3/2008 | Lai et al. | |
| 2009/0084531 A1 | 4/2009 | Scordino et al. | |
| 2009/0129092 A1 | 5/2009 | Chin | |
| 2009/0135608 A1 * | 5/2009 | Sell | F21S 8/026 362/365 |
| 2009/0296386 A1 | 12/2009 | Wang et al. | |
| 2010/0204841 A1 | 8/2010 | Chemel et al. | |
| 2010/0225217 A1 * | 9/2010 | Liu | F21V 29/004 313/12 |
| 2012/0044374 A1 | 2/2012 | Pohlert et al. | |
| 2012/0063116 A1 | 3/2012 | Baxter et al. | |
| 2013/0056706 A1 | 3/2013 | Baxter | |

FOREIGN PATENT DOCUMENTS

| | | |
|---|---|---|
| WO | 2006113745 A2 | 10/2006 |
| WO | 2009033051 A1 | 3/2009 |
| WO | 2011103518 A1 | 8/2011 |
| WO | 2011116031 A2 | 9/2011 |
| WO | 2011116031 A3 | 9/2011 |
| WO | 2011127481 A2 | 10/2011 |
| WO | 2011127481 A3 | 3/2012 |
| WO | 2013033728 A1 | 3/2013 |

OTHER PUBLICATIONS

European Patent Office PCT Written Opinion, International Application No. PCT/US2011/028573, dated Sep. 2, 2011.
Lighting for Television and Film by Gerald Millerson (3rd ed. 1991), pp. 96-131.
Lighting for Television and Film by Gerald Millerson (3rd ed. 1991), pp. 295-349.
Professional Lighting Handbook by Verne Carlson (2nd ed. 1991), pp. 15-40.
"Investigation of Local Ions Distributions in Polymer Based Light Emitting Cells," Proc. Current Developments of Microelectronics, Bad Hofgastein (Mar. 1999).

* cited by examiner

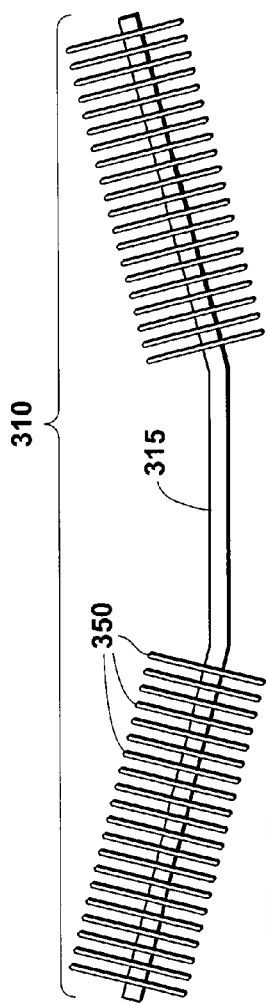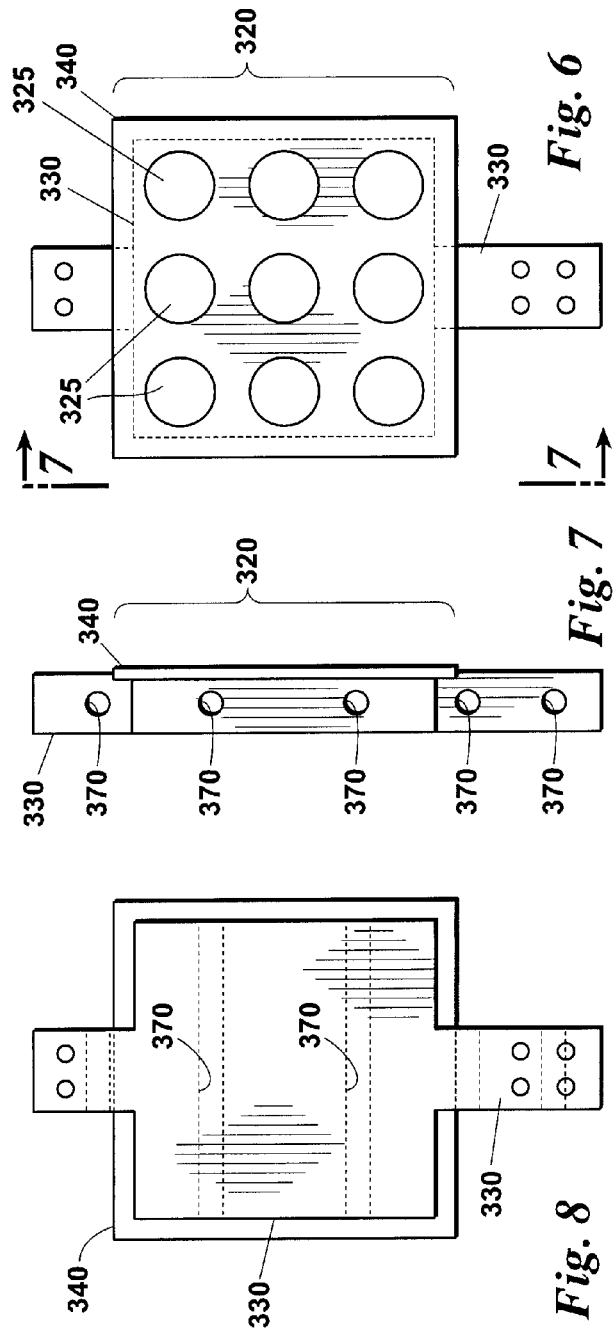

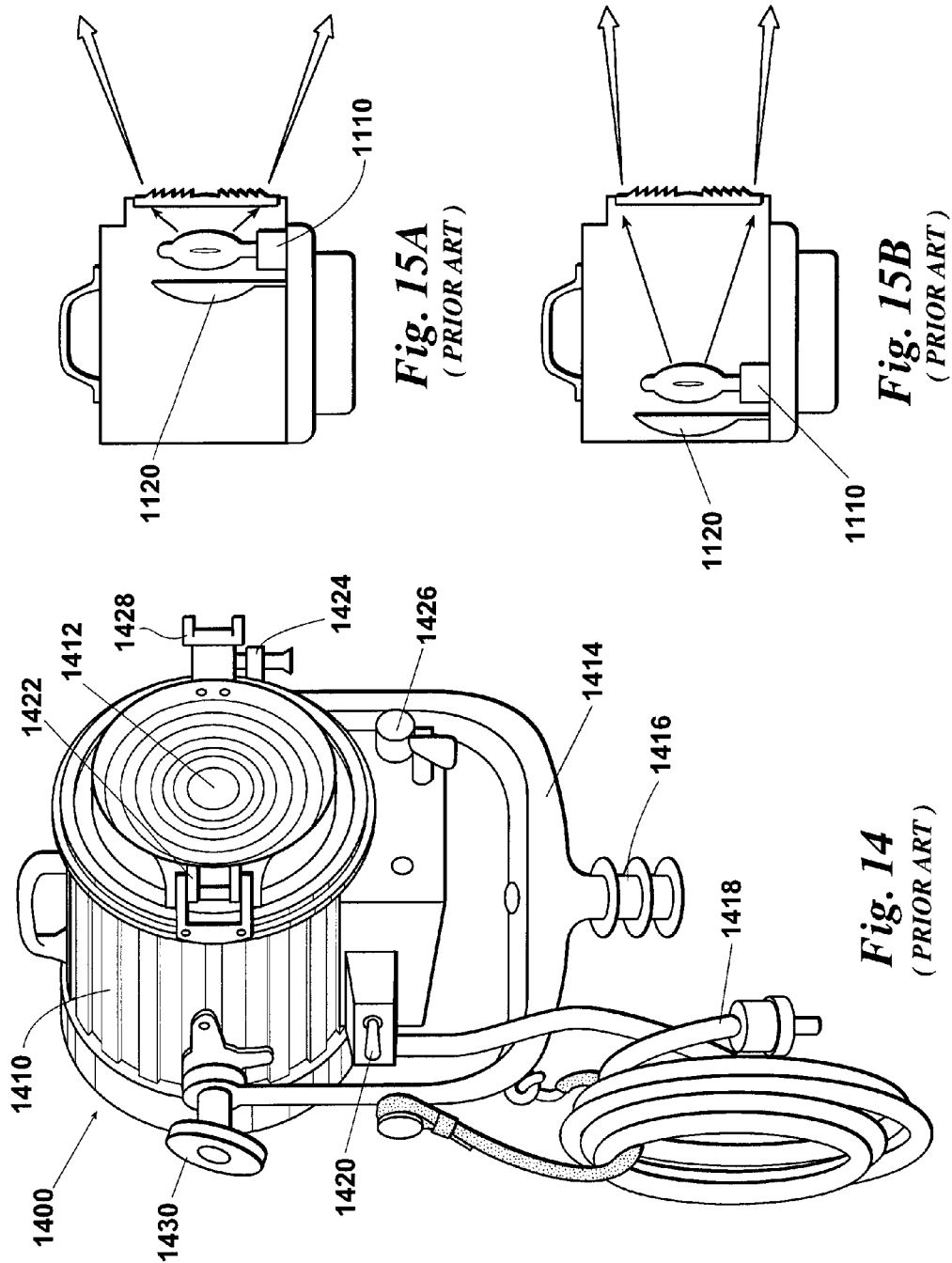

PLUG COMPATIBLE LED REPLACEMENT FOR INCANDESCENT LIGHT

CROSS REFERENCE TO RELATED APPLICATION

This application claims the benefit of U.S. Provisional Patent Application Ser. No. 61/473,705 filed on Apr. 8, 2011, and incorporates said provisional application by reference into this disclosure as if fully set out at this point.

FIELD OF THE INVENTION

The field of the present invention relates to lighting fixtures and systems as may be used in photography, film, television, video, motion picture and other applications.

BACKGROUND OF THE INVENTION

Lighting systems are an integral part of the film, television, video, motion picture, and photography industries. Proper illumination is necessary when filming movies, television shows, or commercials, when shooting video clips, or when taking still photographs, whether such activities are carried out indoors or outdoors. A desired illumination effect may also be ordered for live performances on stage or in any other type of setting.

Various conventional techniques for lighting in the film and television industries, and various illustrations of lighting equipment, are described, for example, in Lighting for Television and Film by Gerald Millerson (3rd ed. 1991), hereby incorporated herein by reference in its entirety, including pages 96-131 and 295-349 thereof, and in Professional Lighting Handbook by Verne Carlson (2nd ed. 1991), also hereby incorporated herein by reference in its entirety, including pages 15-40 thereof.

Fresnel lenses were designed originally to allow for large geometry lensing in lighthouses, well before the advent of the true incandescent light bulb. Fresnel lenses were later used in early theatrical and movie lighting fixtures because they allowed the light to be shaped into beams of smooth light that could project for great distances. Such lighting fixtures are commonly referred to as "Fresnels."

As stated above, Fresnel fixtures including glass lenses were and are used for film, television, motion picture, and live theatre applications. Typical Fresnel fixtures consist of a metal housing, reflector, light bulb assembly, and Fresnel lens. Fresnels fixtures for theatrical applications are commonly available in lens diameters of 3, 6 or 8 inches with globes ranging in power from 150 W (typically with a 3-inch Fresnel lens) to 2000 W (with an 8-inch Fresnel lens). In film, television, and motion picture lighting, a much greater range of lens and bulb sizes are typical. For these applications, lenses commonly range in size from 2 to 24 inches, and light bulb power ranges between 200 W and 20,000 W.

Known Fresnel fixtures may have a mechanism for changing the focal distance between the light bulb and the lens. Many Fresnel fixtures allow the light bulb inside the fixture to be moved relative to the lens focal point to increase or decrease the size of the projected light beam. Such adjustment, typically accomplished via a knob on the back of the fixture, varies from a narrowly focused beam (spot) to a wider beam (flood). Fresnel fixtures have been known to produce a beam as narrow as 7° or as wide as 70°.

Fresnel fixtures are useful in the film, motion picture and television industries not only because of their ability to focus a brighter beam than a typical lens, but also because the projected light is of relatively consistent intensity across the entire width of the beam. Fresnel fixtures are also known to produce a very soft-edged beam which makes them suitable for use as a wash light. In still photography, Fresnel fixtures have been used as a highlight, sidelight/backlight or kicker. A frame in front of the lens is often used to hold a gel to tint the light or wire screens to reduce it or frosted plastic to diffuse it. Barn doors are commonly used primarily to control light spillage or to shape the light.

However, this is not to say that existing (and historical) Fresnel lighting fixtures are efficient in any way. These conventional lighting fixtures have drawbacks or limitations which can limit their flexibility and/or effectiveness. Most of the light that is emitted by an omni-directional light bulb inside known Fresnel fixtures actually strikes and is absorbed and wasted by the cylinder shaped housing of these fixtures. A small portion of the light is bounced off a curved mirror in the back of the fixture and a small portion goes directly out the Fresnel lens. This leaves relatively little of the total light generated to be able to exit the Fresnel lens as harnessed light. Incandescent bulbs are very inefficient to start with and by then introducing them into a Fresnel housing their efficiency drops even further. Moreover, the reflector cannot be larger than the lens aperture, and thus all the radiated light that is neither redirected forward by the spherical reflector behind the bulb nor emitted directly through the lens is absorbed by the casing as waste heat. The major drawback of Fresnel fixtures is the enormous amount of heat energy generated by the bulbs and absorbed by the casing.

There are many existing Fresnel fixtures being used in the television and motion picture industries. These fixtures have inefficient incandescent bulbs but otherwise are solid and very well made. There is also an enormous amount of existing supporting infrastructure that is meant to power this old equipment such as the power grid and dimmer electronics and dimmer control boards which represent what was a large capital investment.

It would be huge commercial advantage if there were some way to simply and affordably upgrade these existing Fresnel fixtures to work with LED illumination sources that utilized as much of the existing supporting infrastructure as possible. There are multiple challenges to this approach in that there are enormous thermal challenges in matching the high flux densities in incandescent Fresnel fixtures using LED emitters not to mention simply discharging that heat. There are also several types of electrical power that existing power grids and dimmer electronics use, such as Triac based dimmers which use AC power and simply turn on the power at predetermined intervals in relation to the AC sine wave phase; Variac dimmers which use variable transformers, which vary the amplitude of the AC voltage; and though antiquated, even DC power systems which power lighting fixtures in an isolated manner so that they can be used around water and in other hazardous situations. None of these power systems are directly suitable to be used with LED based emitters.

SUMMARY OF THE INVENTION

Applicant incorporates herein by reference the disclosure of U.S. Pat. No. 7,429,117 as if fully set out at this point.

The invention is generally directed in one aspect to a novel and versatile light generating device which is compatible with a Fresnel fixture and utilizes active cooling. For purposes of the instant invention, the term "active cooling" should be broadly construed to include traditional modes of active cooling (e.g., forced air, circulated water or other fluid, etc.) as well as assisted cooling which would include some mechanism for cooling beyond that offered by the conduction/convention afforded by a traditional heat sink, i.e., something other than stationary air heat convection.

According to a first preferred embodiment and as is disclosed herein, there is provided a plug compatible LED engine that is suitable for use with existing Fresnel fixtures. In the preferred arrangement, the instant invention will directly replace a conventional Fresnel globe and reflector with a cooled LED engine that is plug compatible with the existing socket. In the preferred arrangement the LED engine will be plug compatible with the existing Fresnel globe so that it can be installed as a unit into a Fresnel fixture. Note that for purposes of the instant invention "plug compatible" should be understood to mean instances where the LED engine is directly compatible with the existing (e.g., incandescent) fixture, or where it connects directly to the existing (e.g., incandescent) socket, or where it connects to the existing socket via an adapter.

It should also be noted that the instant invention is an advance over the prior art in that, first, an LED board plus its support apparatus is designed to plug directly into an existing Fresnel globe socket. Additionally, the instant invention is comprised not only of a light source but also a cooling source, which has not been seen heretofore.

In a preferred arrangement the instant invention will be mountable on the existing bulb socket in a Fresnel fixture. These vintage bulb sockets are physically robust and rated for 8 to 20 times the current required by the inventive LED engine. The LED engine will preferably have plugs that are mechanically compatible with the Fresnel socket. Use of this sort of mount will hold the LED engine at the position that would be required for the optics when a conventional bulb is used and the socket will be more than sufficient to power the inventive electronics which as well as the LED engine.

Note that in existing incandescent based Fresnel fixtures there is generally a rear mirror that captures some of the omni-directional light from a Fresnel bulb. It is well known that these mirrors degrade over time and consequently are generally relatively easy to replace and or remove. In the inventive bulb replacement system, the mirror will not be needed and so the space that it occupies can better be used, for example, to position heat sinks, power supplies, a fan, and the like within the existing legacy fixture.

As will be described in greater detail below, the inventive electronics require a very small amount of low voltage DC current in order to power a control circuit, and this circuit preferably will have a microprocessor that can watch the incoming power and determine both its type and its dimming level. These electronics will then preferably determine how and when to drive the high power output to the LED engine. When traditional dimmers deliver an AC voltage as low as 20-30 volts the incandescent bulb begins to glow and the inventive system will similarly be able to power up its low power control circuit at about this same voltage and then begin to power the LED engine at about the same brightness level as the incandescent system, thereby allowing the operator to dim the light emitted from the LED engine as might be done with a conventional bulb. Depending on the exact incandescent bulb and the unique properties of the control circuit there maybe some difference in apparent turn-on voltage but they should be somewhat close to the same.

The LED light source will preferably be mounted to a heat dissipating apparatus to provide active cooling, the LED and heat dissipating apparatus together comprising the LED engine as that term is used herein. The Fresnel socket is preferably adjustable within its lighting fixture to allow it to be moved (e.g., via a stepper motor and worm gear and/or crank and worm gear) within the housing with respect to the lens so as to adjust the beam that is projected from the LED panel through the Fresnel lens and emitted from the fixture. Light shaping diffusion (LSD) may be included on or in the housing. A power supply unit may also be included in the housing. When attached together, such as in electrical connection, and enclosed in the housing, the Fresnel lens, LSD, LED engine and power supply unit function as an integrated self-contained lighting apparatus. A touch screen may be positioned in the housing to interface with the technical operator. Optionally, the lighting fixture may have an integrated dimmer switch, and may be capable of receiving PFC power or have an integrated (or removably attached) battery unit.

The LED engine of one embodiment of the present invention employs active cooling to evacuate the highly concentrated heat of a tight array of high power LEDs to outside the Fresnel housing in an efficient and quiet way. The instant LED engine employs a heat sink preferably supplemented with active cooling in high power applications to evacuate the LED-generated heat outside of the housing. The preferred LED engine may use heat pipes as a silent but active cooling solution. The inventive LED engine may alternatively use a recirculated liquid pipe system (either powered or passive) to move heat away from the heat sink. If the liquid system is powered by a pump, the noise level will be minimal since the associated noise would originate from a liquid pump. The cooling system might also include one or more Peltier modules that are operating alone or in conjunction with other of the approaches mentioned herein.

The use of fans in motion picture equipment is generally prohibited because the noise that is emitted therefrom can be picked up by the sound recording instruments that record the audio component of the movie. However, the present LED based Fresnel fixture may use a large diameter fan (or fans) or other forced air system running at low speeds or in a laminar flow mode. A fan (or fans) operating in laminar flow mode do not generate turbulence and consequently the only substantial noise source is the bearings and windings in the fan motor which operate at an extremely low and acceptable sound level.

The present fixture, in a preferred embodiment, includes a power supply built into the fixture, as opposed to a separate unit connected to the fixture with a special cable. The Fresnel fixture of the present disclosure may be operated by DMX control, by wireless control, or other suitable means, and is powered by any common AC voltage available any place in the world or alternatively by batteries. The present LED based Fresnel fixture may be configured to include a "power factor correction" (PFC) front end on the AC power supply. A suitable power supply unit is disclosed in United States Patent Application No. 2005/0207196 published on Sep. 22, 2005, and incorporated herein fully by reference, however, other suitable power supply units may be known to one of skill in the art and substituted. The power supply of the preferred arrangement would differ from the published disclosure only in that the battery unit would be substituted with AC power supply with a PFC front end. The PFC may be electrically connected to a fixed buck regulator which is, in turn, electrically connected to a dimmable buck regulator. In such an arrangement, the center fixed buck regulator may protect the LED panel or board in the event of failure of the dimmable buck while the dimmable buck may protect the LED panel or board against failure of the middle fixed buck.

It is understood that a battery unit (integral to or removable from the fixture) could be included to provide power to the power supply unit.

Different from any existing LED assembly, an embodiment of the LED engine of the present disclosure can be used with a lightweight plastic Fresnel lens because heat resistant glass (such as Pyrex®) is not required. White LEDs do not emit infrared light nor do they emit ultraviolet light which most other commercially available light sources do. The glass Fresnel lens is one of the heaviest and most expensive components in existing Fresnel fixtures and they are generally not as efficient as a plastic lens. Glass (Pyrex®) lenses have to have a small radius at the edges of each of the lens elements to keep a stress fracture from forming. Plastics such as Plexiglas and Polycarbonate, in contrast, can have many more elements on the order of a magnitude greater than glass and have no efficiency robbing small radius curves on the edges of the Fresnel elements. In addition, plastic Fresnel lenses can be molded (including injection molded) and do not require expensive and time consuming grinding or casting like glass Fresnels. As a result, plastic Fresnel lenses can be produced in a more cost effective manner to produce a more precise lens.

An embodiment of the LED engine of the present disclosure may have an SD (secure digital) interface so the software base can be installed. A common issue with Fresnel fixtures is that they tend to include aberrations (e.g., they produce colored light) at the edges of the projected beam. The Fresnel fixture of the present disclosure may also employ light shaping diffusion ("LSD") to accurately spread the light and to erase chromatic aberrations introduced by the Fresnel lens. In addition to correcting aberration, LSD will also integrate the light of the many LED elements ("hot spots" caused by multiple light sources projected from the light array) so they will project as an even (uniform) beam. LSD material is commercially available and typically printed in predetermined directions, or even patterns, so that the present fixture may be capable of projecting light at preselected beam angles (such as a 16:9 ratio for HD, for example) as may be desired. In a preferred arrangement, a 2° to 40° LSD, or any range in between, is acceptable with 5° to 10° LSD being a preferable range, and 5° LSD being particularly suitable. It is contemplated that the LSD in the present disclosure could either be a separate lens or, in the alternative, the LSD could be cast or molded into, or printed onto, the backside of the Fresnel lens.

As an alternative to installing software via an SD interface, such installations and updates may be performed over the Internet through a wired or wireless interface. Wireless remote access could be performed using Wi-Fi, employing 802.11 G or N protocol with a TCP/IP network protocol to interface. In addition, a fixture with wireless connectivity may be transported from one remote location to the next and still receive periodic software updates as necessary.

A preferred Fresnel lighting fixture of the present disclosure may also be embodied to include an effects generator suitable for providing continuous illumination of a subject for video capture and still photography. The continuous illumination is also particularly suited to use as a modeling light for still photography. Furthermore, when a burst of light such as a flash or strobe is required, the Fresnel lighting fixture of this embodiment will be capable of generating this required effect in a boost mode. The lighting fixture may also be dimmable in both the continuous or boost mode operation. In addition the light emitted may be shaped or color balanced as desired. Accordingly, continuous illumination such as for modeling and a boost mode for flash or strobe will preferably be accomplished in the same light emitter in the same color balance (same quality of light). As will be apparent to one of ordinary skill in the art, in the flash mode, dissipation of the heat produced by the LED during the high power flash is typically not a major concern because of the short time duration of the illumination event. Thus, an embodiment of the invention could provide a simplified heat sink for the relatively low power modeling mode that allows extremely high power flashes without a concern over heat dissipation.

In various forms and embodiments, the Fresnel lighting fixture of the present disclosure may be adapted for being mounted to a stand, and may include adapters for such a purpose. An embodiment of the inventive fixture will have a yoke and the yoke will have a receiver or mount for a lighting stand. The lighting fixture may also be provided with a diffusion lens or color gels, barn doors, and the like which are well known in the art and which may be integrated with or detachable from the lighting fixture in a known manner.

The present Fresnel may conveniently be provided in the form of a kit, with one or more Fresnel lighting fixtures, stand, connecting cable(s), adapter(s), lenses or color gels, or may include a self-contained battery unit (integral or removable) and so on, being provided in a single package to allow flexibility and versatility to users in the field. Or alternatively, it may be shipped to a remote event location, such as a sporting event, stadium, or arena, live news event, or the like; set up by a local technician (gaffer) and operated remotely from a base location, thereby eliminating the need for the lighting director (and crew) to travel to the actual event location.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 5 depicts a preferred cooling arm suitable for use with the instant invention.

FIG. 6 contains a schematic illustration of a portion of the embodiment of FIG. 4.

FIG. 7 contains a cross-sectional view of the embodiment of FIG. 6.

FIG. 8 contains a detailed view of a heat sink suitable for use with the instant invention.

FIG. 14 contains a schematic illustration of a typical prior art Fresnel lighting fixture.

FIGS. 15A and 15B contains cross sectional views of the embodiment of FIG. 14, where the globe/reflector combination are in flood and spot positions, respectively.

DESCRIPTION OF THE PREFERRED EMBODIMENTS

Figure 1:
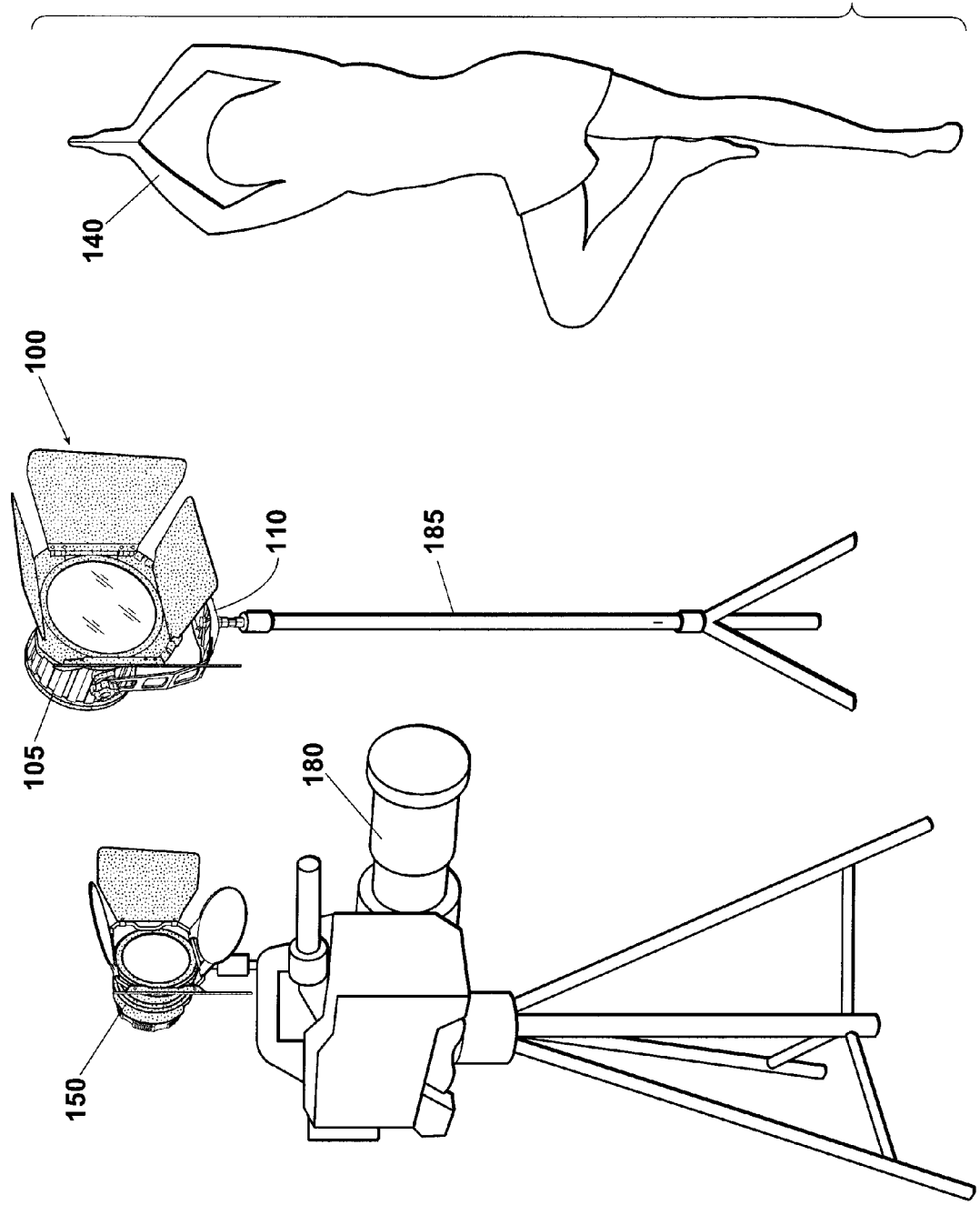
FIG. 1 contains a schematic illustration of a preferred general environment of the invention.

Before describing preferred embodiment(s) of the present invention, an explanation is provided of several terms used herein.

The term "lamp element" is intended to refer to any controllable luminescent device, whether it be a light-emitting diode ("LED"), light-emitting electrochemical cell ("LEC"), a fluorescent lamp, an incandescent lamp, or any other type of artificial light source. The term "semiconductor light element" or "semiconductor light emitter" refers to any lamp element that is manufactured in whole or part using semiconductor techniques, and is intended to encompass at least light-emitting diodes (LEDs) and light-emitting electrochemical cell (LECs).

The term "light-emitting diode" or "LED" refers to a particular class of semiconductor devices that emit visible light when electric current passes through them, and includes both traditional low power versions (operating in, e.g., the 60 mW range) as well as high output versions such as those operating in the range of 1 Watt and up, though still typically lower in wattage than an incandescent bulb used in such application. Many different chemistries and techniques are used in the construction of LEDs. Aluminum indium gallium phosphide and other similar materials have been used, for example, to make warm colors such as red, orange, and amber. A few other examples are: indium gallium nitride (InGaN) for blue, InGaN with a phosphor coating for white, and Indium gallium arsenide with Indium phosphide for certain infrared colors. A relatively recent LED composition uses Indium gallium nitride (InGaN) with a phosphor coating. It should be understood that the foregoing LED material compositions are mentioned not by way of limitation, but merely as examples. The LED array would be comprised of semiconductor based lighting elements such as blue LEDs with a direct coating of direct phosphors or remote phosphors, the semiconductor based lighting elements could also be, surface mount, chip-on-board, or a combination or red, green, and blue LEDs or a combination of all of the above.

The term "light-emitting electrochemical cell" or LEC" refers to any of a class of light emitting optoelectronic devices comprising a polymer blend embedded between two electrodes, at least one of the two electrodes being transparent in nature. The polymeric blend may be made from a luminescent polymer, a sale, and an ion-conducting polymer, and various different colors are available. Further background regarding LECs may be found, for example, in the technical references D. H. Hwang et al, "New Luminescent Polymers for LEDs and LECs," Macromolecular Symposia 125, 111 (1998), M. Gritsch et al, "Investigation of Local Ions Distributions in Polymer Based Light Emitting Cells," Proc. Current Developments of Microelectronics, Bad Hofgastein (March 1999), and J. C. deMello et al, "The Electric Field Distribution in Polymer LECs," Phys. Rev. Lett. 85(2), 421 (2000), all of which are hereby incorporated by reference as if set forth fully herein.

The term "color temperature" refers to the temperature at which a blackbody would need to emit radiant energy in order to produce a color that is generated by the radiant energy of a given source, such as a lamp or other light source. A few color temperatures are of particular note because they relate to the film and photographic arts. A color temperature in the range of 3200° Kelvin (or 3200° K) is sometimes referred to as "tungsten" or "tungsten balanced." A color temperature of "tungsten" as used herein means a color temperature suitable for use with tungsten film, and, depending upon the particulars of the light source and the film in question, may generally cover the color temperature range anywhere from about 1000° Kelvin to about 4200° Kelvin. A color temperature in the range of 5500° Kelvin (or 5500° K) is sometimes referred to as "daylight" or "daylight balanced." Because the color of daylight changes with season, as well as changes in altitude and atmosphere, among other things, the color temperature of "daylight" is a relative description and varies depending upon the conditions. A color temperature of "daylight" as used herein means a color temperature suitable for use with daylight film, and, depending upon the particulars of the light source and the film in question, may generally cover the color temperature range anywhere from about 4200° Kelvin to about 9500° Kelvin.

The lighting apparatuses of the present disclosure may utilize any number of LEDs in a bi-color or other multi-color arrangement. Various embodiments of lighting apparatus as described herein utilize different LEDs in order to achieve, for example, increased versatility or other benefits in a single lighting mechanism. Among the various embodiments described herein are combinations of LEDs that some of which are color matched daylight and others of which are color matched to tungsten for providing illumination in a controllable ratio. Such apparatuses may find particular advantage in film-related applications where it can be important to match the color of lighting with a selected film type, such as daylight or tungsten. More importantly, such an arrangement would allow a user to match ambient light color.

In various embodiments as disclosed herein, a lighting apparatus is provided which utilizes two or more complementary colored LEDs in order to achieve a variety of lighting combinations which, for example, may be particularly useful for providing illumination for film or other image capture applications. A particular example will be described with respect to a lighting apparatus using LEDs of two different colors, herein referred to as a "bi-color" lighting apparatus. In a preferred embodiment, the bi-color lighting apparatus utilizes light elements of two different colors which are separated by a relatively small difference in their shift or color balance. When reference is made herein to light elements of two different colors, the light elements may, for example, include a first group which provide light output at a first color and a second group which provide light output at a second color, or else the light elements may all output light of a single color but selected ones of the light elements may be provided with colored LED lenses or filtering to generate the second color. In a preferred embodiment, as will be described, the bi-color lighting apparatus uses LEDs having daylight and tungsten hues (for example, 5500° K and 3200° K color temperatures, respectively). Other bi-color combinations may also be used and, preferably, other combinations of colors which are closely in hue or otherwise complementary in nature.

One possible advantage of a bi-color lighting system as contained in the preferred embodiments below is the ability to more easily blend two similar colors (e.g., 5500 K and 3200 K color temperature hues), particularly when compared to a tri-color (e.g., RGB) lighting system that relies upon opposing or widely disparate colors. The blending process of two similar colors is not nearly as apparent to the eye, and more importantly in certain applications, is a more suitable lighting process for film or video image capture devices. In contrast, attempting to blend three primary or highly saturated (and nearly opposite colors) is much more apparent to the eye. In nature one may visually perceive the blending of bi-colors, for example, from an open sky blue in the shade, to the warmth of the direct light at sunset. Such colors are generally similar, yet not the same. Their proportion in relation to each other is a naturally occurring gradient in most every naturally lit situation. This difference is the basis of most photographic and motion picture lighting hues. These hues give viewers clues as to time of day, location and season. Allowing separate control of the two different color LEDs, through two separate circuit/dimmer controls or otherwise, provides the ability to easily adjust (e.g., crossfade, cross-dim, etc.) between the two colors because they do not have significant color shifts when dimmed and blend in a visually pleasing manner, allowing the type of color gradients that occur in nature. In addition, virtually all still and motion picture film presently used in the industry is either tungsten or daylight balanced, such that various combinations of daylight and tungsten (including all one color) are well matched directly to the most commonly used film stocks. These features make the preferred lighting apparatus described herein particularly well suited for wide area still, video, and motion picture usage, especially as compared to RGB-based or other similar lighting apparatus. The above principles may also be extended to lighting systems using three or more LED colors.

Referring now to the drawings, wherein the reference numerals indicate the same parts throughout the several views, according to a first preferred embodiment there is provided an LED engine (described more fully below) that is compatible with an existing Fresnel globe, i.e., it will preferably be inserted into, and draw its power from, an existing Fresnel globe socket. Note that, for purposes of the instant invention, the terms "Fresnel lamp," "Fresnel bulb," and globe will have the same meaning. The instant invention preferably utilizes a novel LED engine to permit the use of high wattage LED's in conjunction with Fresnel lenses which, in many instances, might be made of plastic or other low melting point materials.

In the preferred embodiment, phosphor based LEDs will be employed in the LED engine. Phosphor based LEDs are particularly suited because they provide a broad spectrum of light. However, it is understood that the present disclosure is not limited to phosphor based LEDs as others may be suited for particular applications.

FIG. 1 illustrates a general environment in which one preferred embodiment of the instant invention might be used. In some instances, a video camera 180 might be directed toward a subject 140 that is being illuminated by inventive device fixture 100. The camera 180 of FIG. 1, while illustrated as a motion picture-type camera, could be any type of image capture or optical viewing device, whether analog or digital in nature. For example, the camera 180 might use film, video tape, or solid-state image capture circuitry (e.g., CCDs) and may be a still photography camera, a motion picture camera, or some combination of the two.

As is illustrated in FIG. 1, in one embodiment of the inventive lighting fixture 100 the housing 105 is preferably attached to a stand 185. The stand 185 may be of a conventional nature, with a C-shaped yoke 110 for securing the lighting fixture 100 and allowing it to tilt for directional lighting. The C-shaped yoke 110 may be rotatable or pivotable and, thus, conveniently provides a variety of directional lighting options. Another embodiment might involve mounting the instant invention 150 atop the camera 180, or in a studio or sound stage environment, hanging fixture 100 from a truss or rafter.

In alternative embodiments, a ball and socket mechanism may be used to rotate or pivot an attached lighting fixture and might use socket joints similar to those used, for example, with computer monitors. Likewise, in any of the foregoing embodiments, motorization may be employed to control the movement of the lighting yokes or stand. Motorized controls are well known in the art for lighting apparatus (particularly in the performing arts field) and the motorized control may be either automated or manual in nature.

Figure 11:
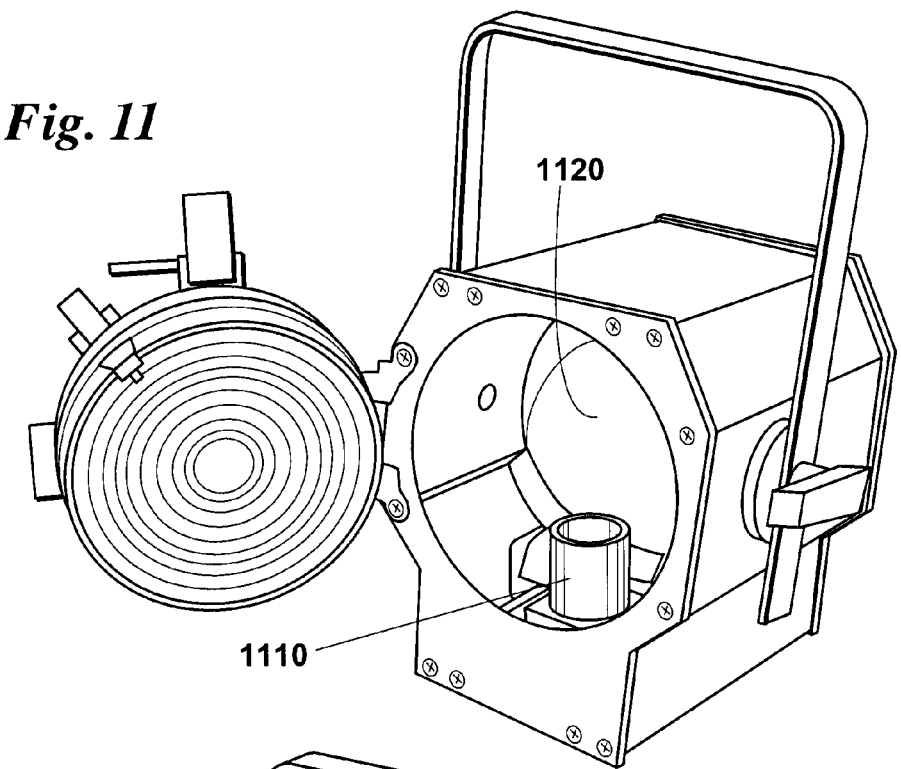
FIG. 11 is a view of the interior of a prior art Fresnel lighting fixture without an incandescent globe and depicts a housing, Fresnel, lens, globe socket and focus rails.

FIGS. 11, 14, and 15 contain various examples of conventional Fresnel lighting fixtures. FIG. 14 contains an annotated illustration of some exterior elements of a conventional Fresnel lighting fixture 1400. Conventional Fresnel lighting fixture 1400 includes an exterior housing 1410 and includes mounted thereto on one end a Fresnel lens 1412. Convention Fresnel fixtures, due to the substantial heat radiated by the convention incandescent bulbs contained therein, include Fresnel lenses, such as 1412 made of thick, heavy, heat-resistant glass. Housing 1410 is commonly supported on a frame such as yoke 1414 which commonly includes a stand adapter 1416 so that yoke 1414 can be supported from the ground by a stand. Yoke 1414 typically is capable of pivoting with respect to the stand so as to allow lateral movement/adjustment of the direction of the beam produced from Fresnel fixture 1400. In addition to the rotation, conventional Fresnel housings such as 1410 are commonly secured to yoke 1414 through the use of a tilt mechanism 1430 to allow the housing and thereby the beam of light projected from the housing to be tilted up and down. A knob tightens and loosens to allow such vertical adjustment. Power is commonly provided to Fresnel fixture 1400 through the use of a power cable such as a conventional power cord 1418. The fixtures are commonly activated through the use of a power switch 1420 which commonly turns on and off the power to the socket and globe contained within housing 1410. Access to the socket and globe within housing 1410 is commonly accomplished by supporting Fresnel lens 1412 to housing 1410 via a hinge mechanism such as 1422 which is secured by a latch 1424 such that when the bulb within the fixture 1400 requires replacement, latch 1424 is unlatched and Fresnel lens 1412 is rotated outward via hinge 1422 to provide access to the interior of housing 1410 to facilitate bulb replacement. Once the bulb is replaced, Fresnel lens 1420 is rotated back into position via hinge 1422 and secured in place by latch 1424. Conventional Fresnel fixtures such as 1400 include a mechanism for focusing the beam projected from housing 1410 through Fresnel lens 1412 as further depicted in FIGS. 15A and 15B and can be adjusted between spot and flood through the use of a focus knob such as 1426. The light projected from Fresnel fixture 1400 through Fresnel lens 1412 can be further modified/restricted/filtered through the use of barn doors or filters or other known devices which could be attached to housing 1410 by barn door mounts 1428.

FIG. 11 contains an interior view of a similar Fresnel lighting fixture. As is conventionally done, a light globe or bulb is conventionally installed within a light socket 1110 that is in electrical communication with a power source. As can be seen more easily in FIGS. 15A and 15B, behind the light source is typically a mirror or reflector 1120 that is intended to reflect at least a portion of the light that is emitted toward the rear of the fixture toward its front. Obviously, unless such a reflective surface is provided a substantial portion of the light emitted by a conventional globe will be wasted.

Finally, FIGS. 15A and 15B illustrate one operational aspect of a conventional Fresnel lighting fixture. As is indicated there, the reflector 1120 is typically configured to move in tandem with the socket 1110/globe combination. The globe/socket 1110 combination is conventionally moved proximate to the Fresnel lens to create a more diffuse or "flood" light source (FIG. 15A). On the other hand, the socket 1110/globe combination are conventionally moved toward the back of the housing to create a more concentrated or "spot" light source (FIG. 15B). Typically the socket 1110/globe combination are moved along one or more "focus rails" which permit movement toward and away from the lens, but do not allow lateral movement. For purposes of the instant disclosure, the term "focus rail" will be used to describe any mechanism for adjusting the location of the light source relative to the lens whether the guiding element are rods, rails, groves, channels, etc. That term should also be understood to extend to cases where the lens is moved relative to the light source as opposed to the scenario that is illustrated in FIG. 15.

Figure 2A:
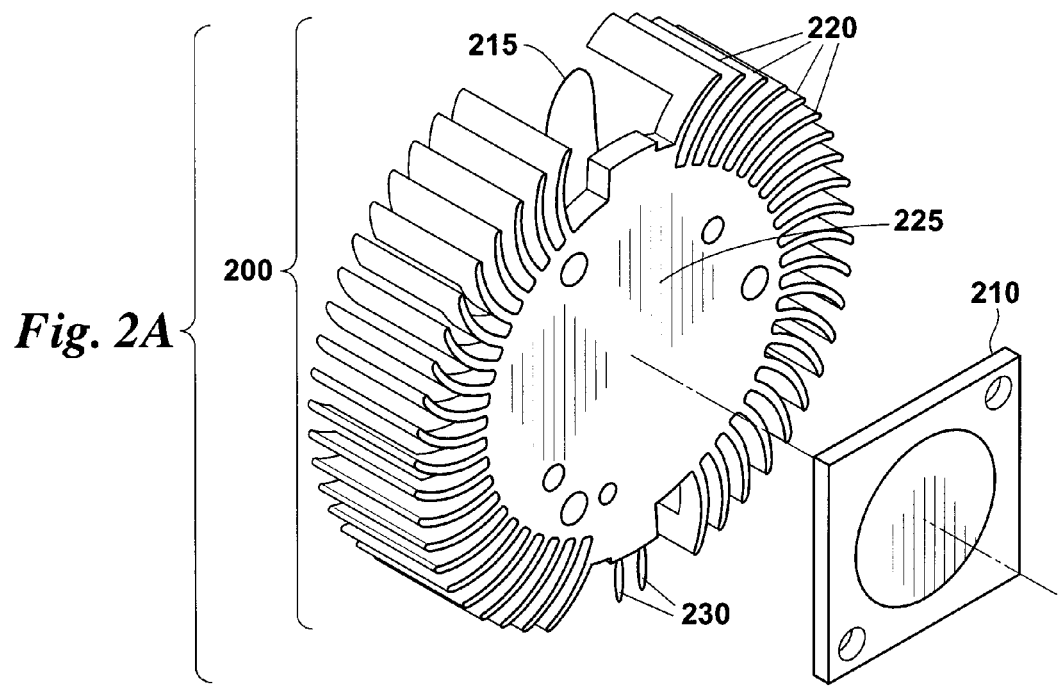
FIG. 2A depicts an exploded view of a preferred LED engine.
Figure 2B:
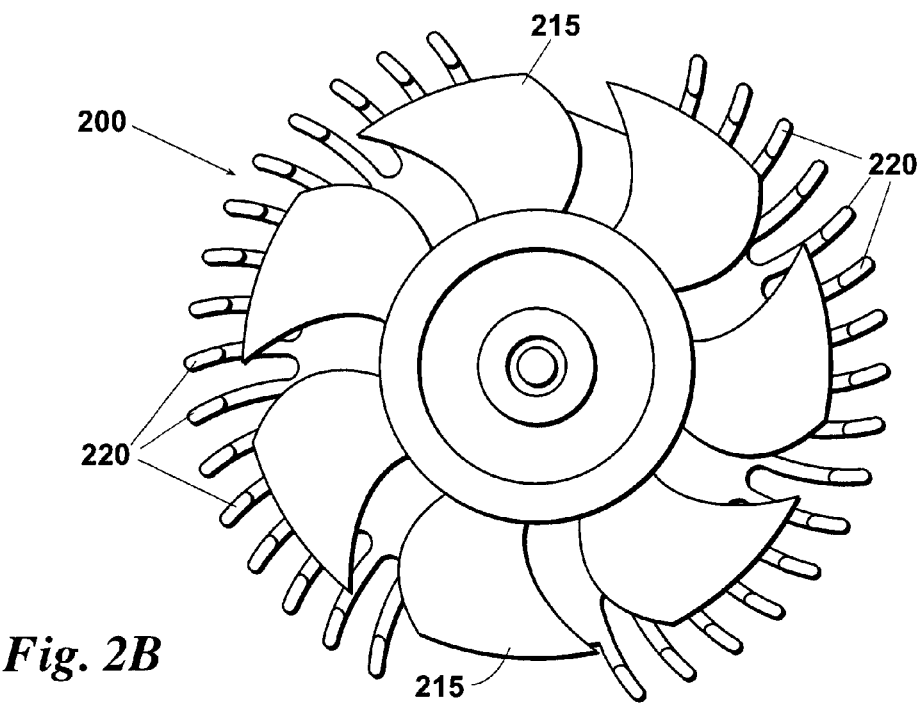
FIG. 2B depicts a rear view of the LED engine of FIG. 2A.

Turning now to a discussion of embodiments of the instant invention, according to a first preferred embodiment there is provided an LED engine that is compatible with existing Fresnel bulb connectors as is generally set out in FIGS. 2A and 2B. In this embodiment, an LED engine 200 is provided that includes a two-prong connector 230 for compatibility with an existing Fresnel bulb connection. Preferably the LED element 210 is mounted to a heat sink platform 225 which houses a motor for a fan 215. In this embodiment, active cooling is provided by heat transfer from LED element 210 to platform 225 which is then dissipated through a plurality of blades or fins 220 positioned radially around platform 225, the blades 220 being oriented in such a way that air is permitted to circulate around fins 220 so as to dissipate heat therefrom. Fan 215 provides active cooling in substantially the same manner as described above such that air is pulled past fins 220 and is exhausted out of the housing of the light as is discussed in greater detail below. In this embodiment fins 220 are solid.

The LED engine 200 in this embodiment will preferably include one or more LED lights 210 in a single tight array. Such light assemblies are available from a manufacturer such as BRIDGELUX®.

In a preferred arrangement, the fan motor that powers the blades 215 will preferably be one that runs very quietly at least when it is operated at low speeds. Additionally, this fan will preferably be sized to be similar in diameter to the interior of the housing in which it is placed. Further, the fan will preferably be oriented so as exhaust air from the rear of the light fixture that is installed within, as is discussed in greater detail below. Further, and preferably, the rotational speed of the fan will be variable and under control of a microprocessor (or other programmable device) that might be located within, adjacent to, or in electrical communication with the fan. Additionally, the LED engine, or microprocessor might also contain a transceiver for communicating over WI-FI, Bluetooth, or other wireless or wired means. This arrangement allows the fan speed to be ramped up as the temperature inside the light fixtures increases, thereby increasing the amount of cooling that is available to the LED engine 200.

With respect to the operating parameters of the fan, in the preferred arrangement, it will be thermostatically controlled. Preferably, a thermistor (or a similar element that is responsive to changes in temperature) will be situated proximate to the LED array 210 on the heat sink 225 (which has proven to be a reliable way to measure the temperature of the LEDs 210) and will be used to regulate the speed of the fan. In the preferred embodiment, a tachometer feedback will be provided to monitor the RPM of the fan. This is preferably accomplished by a fan control system in the microprocessor which calculates the speed of the fan. The speed of the fan will be regulated by the microprocessor. Those of ordinary skill in the art will recognize that it is desirable to operate the fan at as low a speed as is feasible so as to minimize the noise that is produced thereby, but yet fast enough to provide a suitable amount of active cooling for the LED or LED array 210. On the other hand, there will be times when the fan must be operated at near maximum RPM to prevent damage to the components of the light fixture. Although the exact operating parameters of such a fan will likely need to be determined empirically, the instant inventors have determined that for a 6" light with a light output of 75 W, for example, when the temperature of the heat sink 130 is below, say, 60° C., the fan will be operated at a fairly low speed, e.g., about 900 RPM. On the other hand, when the temperature is at or about 70° C., the fan will be operated at near full speed, e.g., at about 1700 rpm. Between these two limits, the speed of the fan will preferably be varied linearly. Obviously, the foregoing has only been offered as a specific example of the sorts of speeds that might be utilized for the size and power selected and these values should not be construed to be required operating parameters. Other fan speeds could be selected by one of skill in the art which are suitable for use in other light configurations, sizes and applications.

According to another embodiment, there is provided a high wattage LED actively cooled variable focus lighting fixture for use in image capture applications. The instant embodiment preferably utilizes a novel near noiseless active cooling system that permits high wattage LEDs to be used in conjunction with lightweight lenses that are made of materials such as plastic. A preferred embodiment of the inventive device employs a self-contained cooling apparatus that manages the heat that is generated by a LED board to the point where this light source can be used with a plastic Fresnel lens. The preferred cooling apparatus will utilize a variable velocity fan (which is preferably operated at the lower end of its velocity range to minimize noise) or other forced air system together with an evaporation/condensation closed cooling system. In a preferred embodiment, the LED engine will be movable with respect to the lens to vary its focus.

In a preferred embodiment, phosphor based LEDs are employed in the LED engine. Phosphor based LEDs are particularly suited because they provide a broad spectrum of light. However, it is understood that the present disclosure is not limited to phosphor based LEDs as others may be suited for particular applications.

Figure 3:
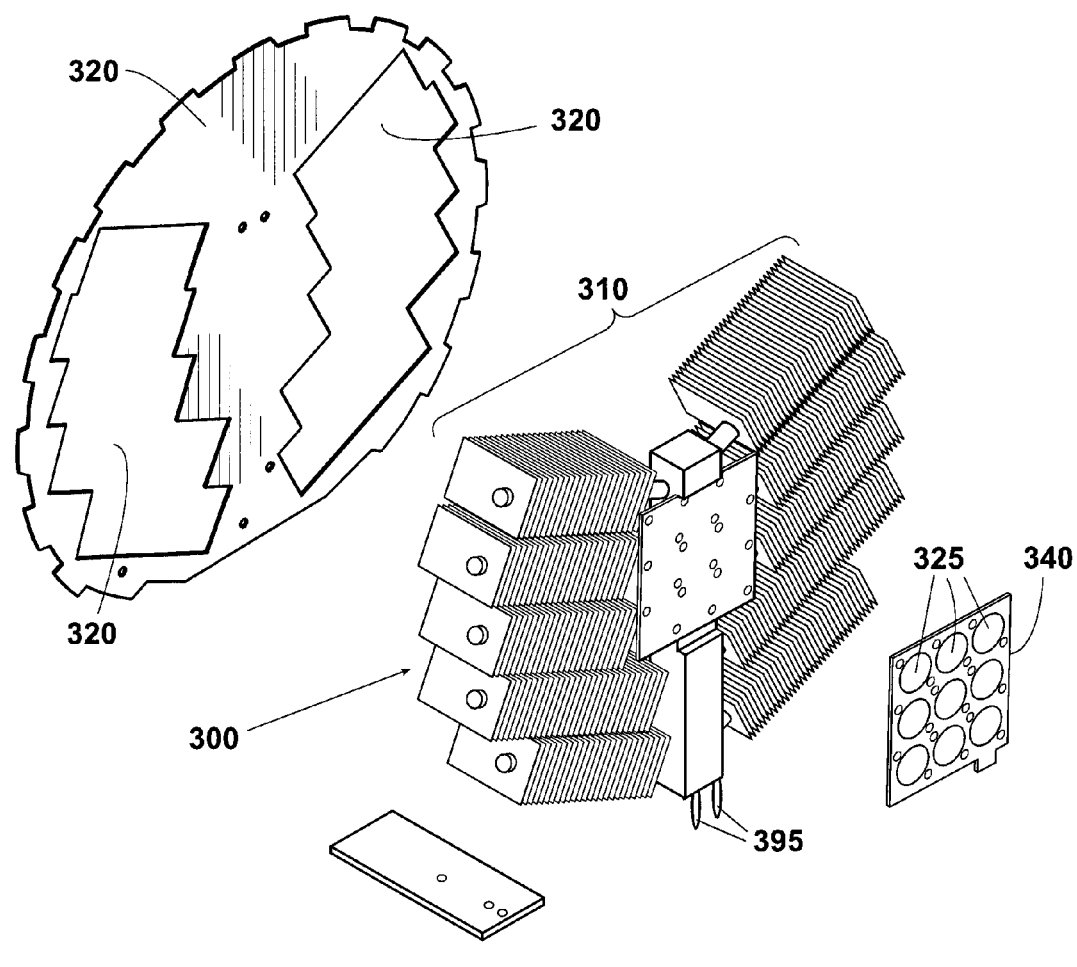
FIG. 3 contains an exploded view of a preferred LCD engine assembly.
Figure 4:
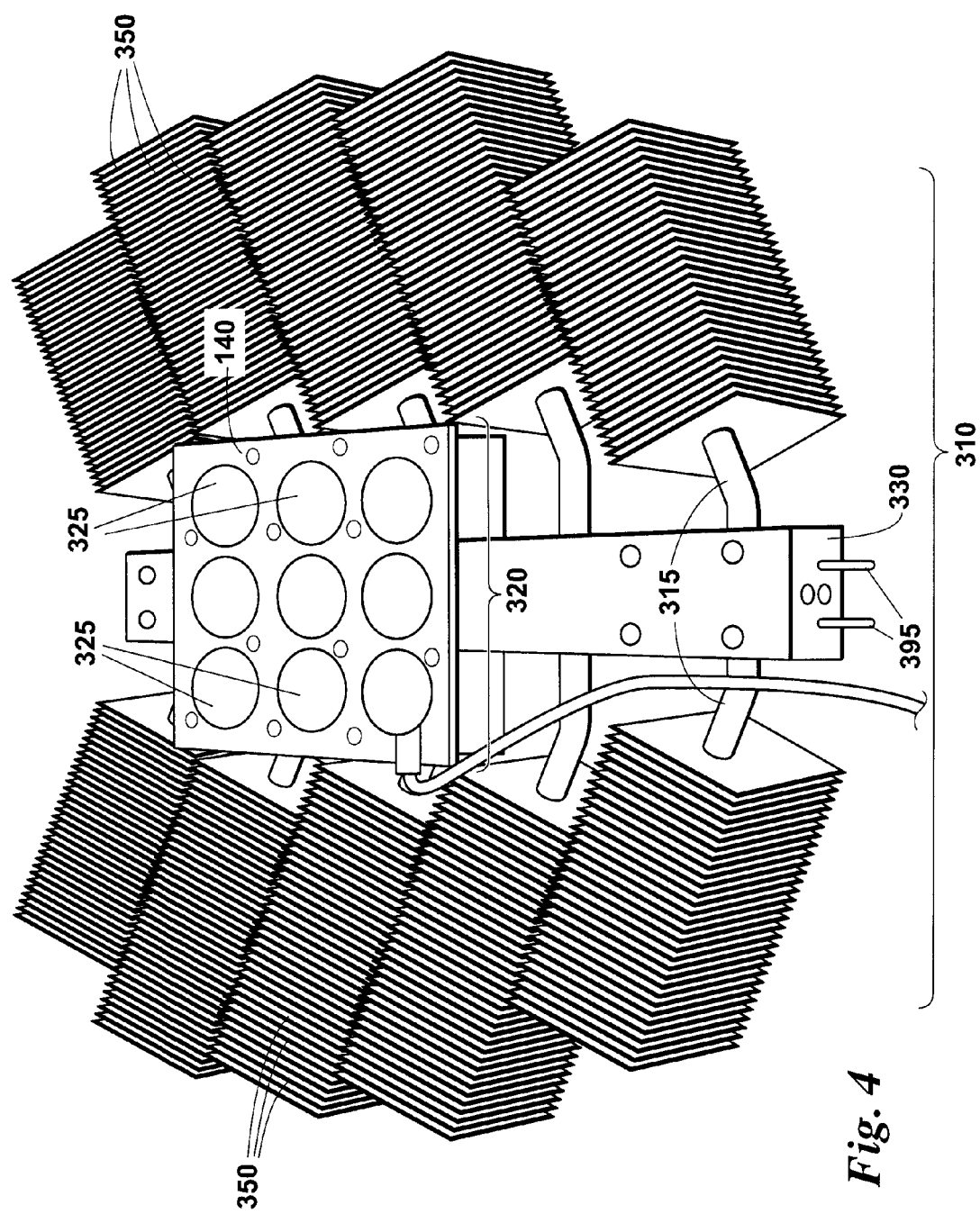
FIG. 4 depicts a preferred embodiment of an LCD engine suitable for use with the instant invention.

FIG. 3 contains an exploded view of an embodiment of the instant invention. Of particular interest is the LED engine 300, as that term is used herein, which comprises some sort of cooling component for example (e.g., cooling element 310) together with an LED array 340. In a preferred arrangement, the LED engine 300 will be surrounded by a generally planar baffle 320 that is sized to largely occupy the interior of the fixture into which it is installed. Preferably, the LED engine 300 will be terminated at its lower extent by electrical connectors 395 that are designed to mate with a Fresnel light socket. In some embodiments the connectors 395 will be dual-prong electrical connectors 395 as is shown in FIG. 4, but it should be clear that the exact electrical connector that is utilized is immaterial to the operation of the instant invention. It is anticipated that, as is conventionally done, it will be possible to adjust the longitudinal position of the assembly 300 within its fixture. This, of course, changes the distance between the LEDs 325 and Fresnel lens, thereby making it possible to vary the focus of the beam that is emitted from the fixture. This aspect of the instant invention will be discussed in greater detail below.

The light from the instant invention is generated by LED engine 300 and, more particularly, by the LED array 340 within the LED engine 300. It should be noted that white LEDs from a manufacturer such as BRIDGELUX® would be acceptable for use with the instant invention. As is made clear in FIG. 3, a preferred LED array 340 contains a number of individual LED elements 325 that are regularly spaced to form a tight array. In the preferred arrangement, the total wattage of the LED array 340 will be at least 100 watts. Lights such as this are especially sought after for use in applications such as movies and commercials, wherein very bright, highly directional white lights are needed to illuminate an individual or product for image capture. However, because of the heat that such a concentrated collection of lights generates and in view of the use of one or more plastic lenses, some sort of cooling will need to be provided as is discussed below.

As can best be seen in FIG. 4, the heat sink 330 will preferably be sized to be commensurate with the LED array 340. The heat sink 330 will preferably be formed from a solid block of aluminum (or any other metal or other material that would be suitable for use as a heat sink). Other materials may be added, employed or substituted in alternate heat sink composition embodiments. Such materials are well known to those of ordinary skill in the art. In a basic embodiment, for example, the heat sink may include extruded aluminum or fins or plates of extruded aluminum or other heat spreading material or thermally conductive material such as thermal pads to provide active cooling.

As is generally indicated in FIGS. 5-8, the heat sink 330 in a preferred embodiment will contain a number of passageways 370 therethrough. Preferably, these passageways 370 will be sized to accommodate the conduits 315 of the cooling arms 310.

In the preferred embodiment, each cooling arm 310 will preferably be a closed system that is separate from the others. Preferably, the cooling arms 310 will be configured to be upwardly sloping away from the center heat sink 330 so that their lowest point will occur within the heat sink 330. The conduit 315 component of each arm 310 will preferably be sealed at both ends for reasons that will be discussed at greater length below. In addition, each conduit 315 will preferably have a number of heat fins 350 attached thereto that are designed to improve the transfer of thermal energy between the air and the conduit 315 according to methods well known to those of ordinary skill in the art.

Inside each conduit 315 will preferably be sealed some amount of a coolant that is preferably liquid at the normal operating temperature of the inventive device. By way of a specific example, water (or water mixed with some amount of an antifreeze such an ethylene glycol if freezing temperatures are expected) would be a suitable coolant. Those of ordinary skill in the art will readily be able to devise a coolant (or coolant mixture) that is suitable for use with the instant invention in a particular operating environment.

The instant invention will thus preferably operate generally as follows. When the LED lights 325 are first activated, the coolant will be at rest throughout the conduit 315. Those of ordinary skill in the art will understand that LED lights generally do not radiate heat as does a conventional (e.g., incandescent) light source. However, heat is generated internally and must be disposed of or possible failure of the LEDs or other electronic components could result. As the LED lights 325 continue to operate, some portion of the heat generated thereby will be absorbed by the heat sink 330. This, in turn, will heat one or more of the cooling conduits 315 at or near the regions where they pass through the heat sink 330.

Inside each heat conduit 315 the coolant will similarly be heated. As the temperature continues to rise, that portion of the coolant that is proximate or within the heat sink will begin to move toward the extremities of the cooling arm 310 via convection as a vapor, i.e., the relatively cooler liquid at the ends of the arms will tend to sink via capillary action back to the middle of the cooling arm 310 while the heated coolant will rise toward the termini. The heated coolant will then lose thermal energy to the walls of the conduit 315 and the cooling fins 350 and then condense. As might be expected, this circulation process will continually repeat itself, thereby creating a closed cooling system within each conduit 315. Thus, it should be clear that it is important but not required for the operation of the instant embodiment that the cooling conduits 315 be generally inclined in an upward direction at their outer extremities with their lowest point being located proximate to or within the heat sink 330 for maximum efficiency.

Additionally, in some preferred embodiments instead of relying on capillary or other thermal expansion, etc., to create circulation in the coolant, it is contemplated that active circulation might be employed. By reconfiguring the heat sink 330 and cooling arms 370, a pump might be employed to circulate the coolant within the LED engine 300 so conduct heat away from the LEDs.

Figure 9:
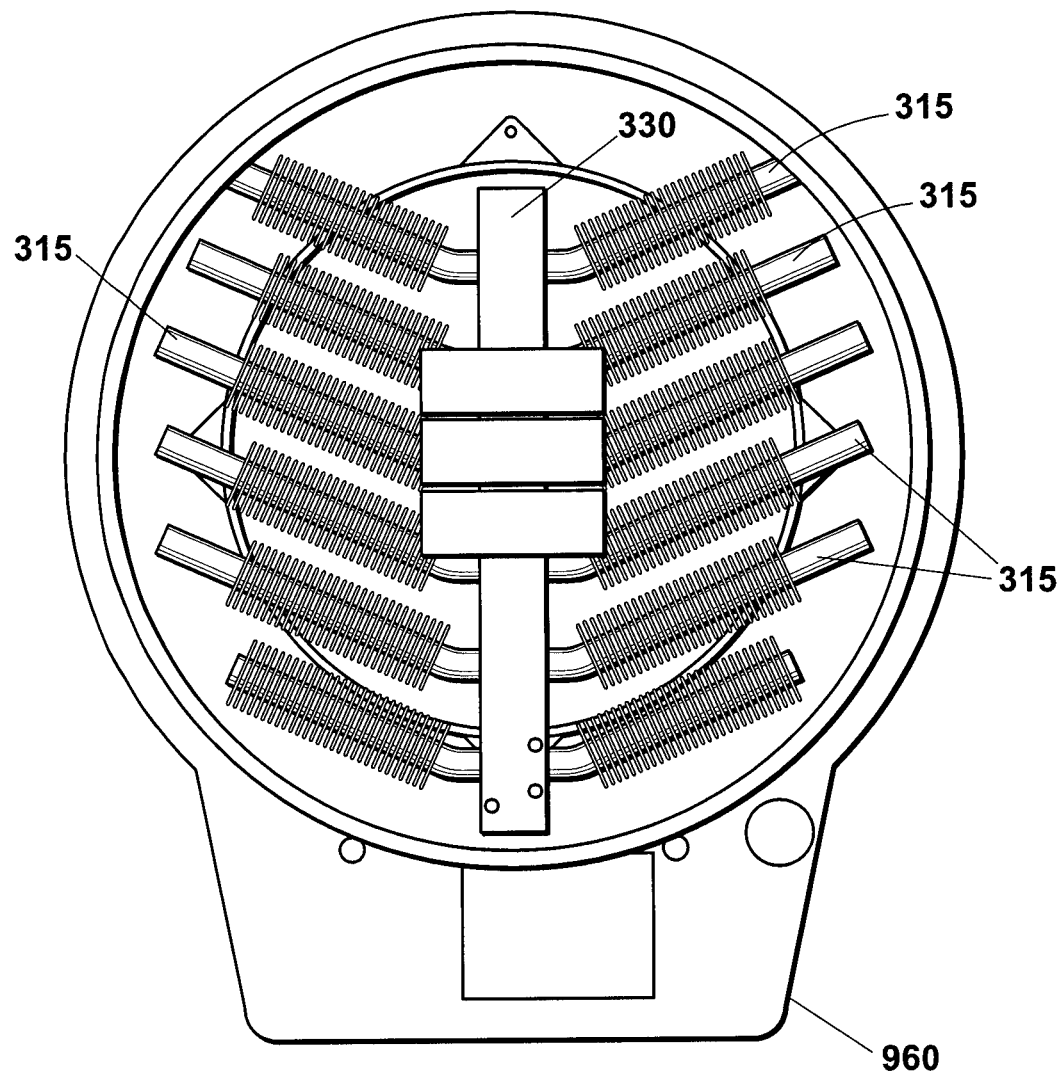
FIG. 9 contains a schematic illustration of another preferred LED engine and housing.
Figure 10:
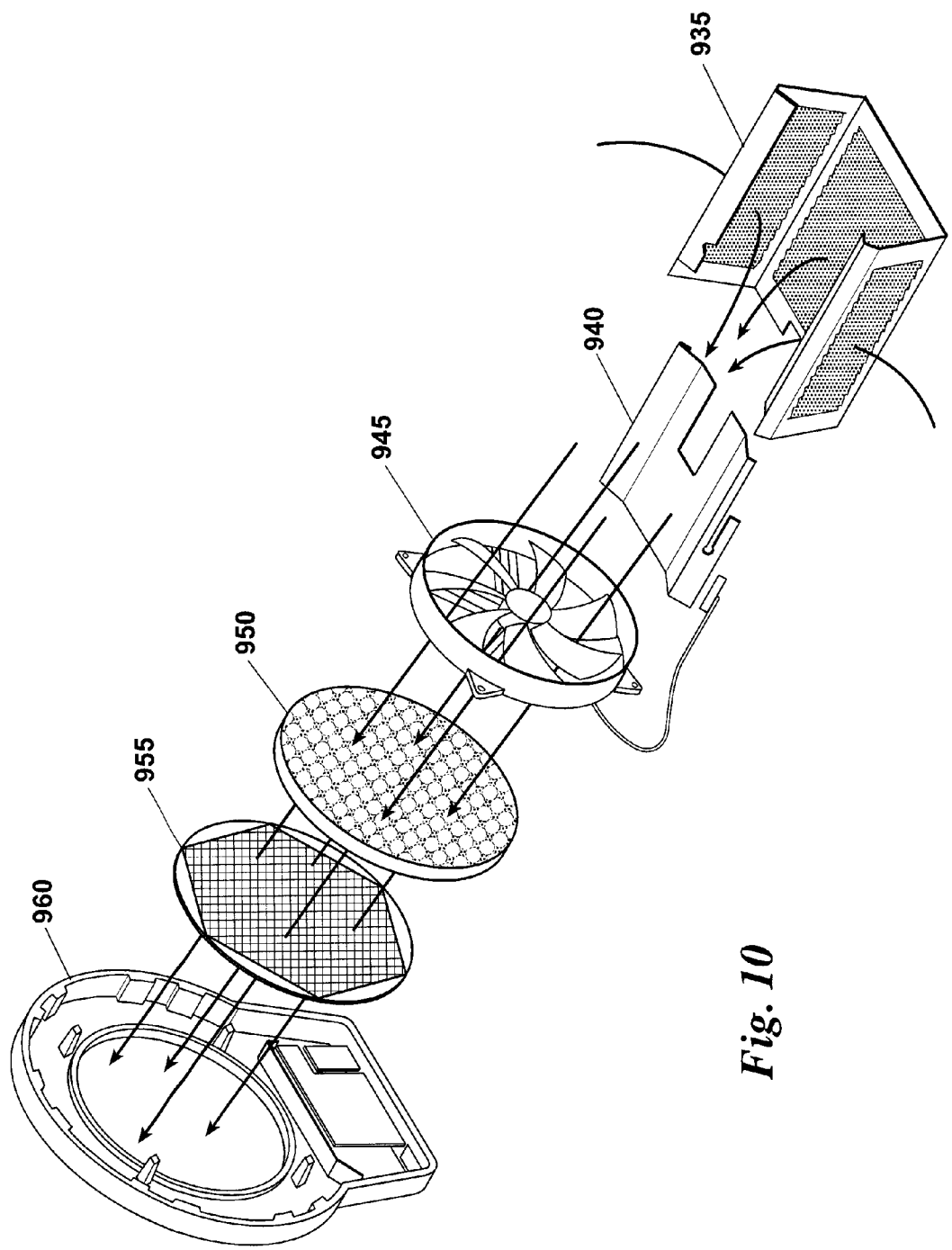
FIG. 10 contains an exploded view of a portion of the embodiment of FIG. 9 which illustrates in a general way how air moves through the instant invention when the fan is in operation.

Turning next to FIG. 9, the cooling of the heat sink 330 is preferably further assisted by the movement of air across the fins 350. FIG. 10 contains an exploded view of the housing/LED engine combination of FIG. 9 and further includes a floor baffle 940 and an optional perforated housing component 935 which could be utilized as part of a Fresnel fixture housing (e.g., as a replacement for the housing base in FIG. 14) to improve the movement of air therein. In this embodiment, when the fan is running, air is drawn through the perforated base 935 of the lighting fixture into the Fresnel housing and is diverted by the air dam 940 which serves to direct the air upward and past the LED engine 300. The baffle 320 then restricts the flow of air such that it must pass through the fins 350, thereby increasing the rate of heat transfer from fins 350 to the air passing thereby.

In this preferred arrangement, at the rear of the Fresnel fixture housing will preferably be a rear cover 960 which preferably contains a perforated aluminum back plate 955 mounted in its central opening. The perforated aluminum back plate 955 will preferably be designed to allow air to pass relatively unimpeded through it. Additionally, and proximate to it or in contact with it, is preferably a generally cylindrical honeycomb panel 950 which contains a very large number of longitudinally aligned, relatively small parallel air passageways therethrough. Although these air passageways may be in any particular shape, preferably they will be hexagonal in cross section, thereby forming a honeycomb-type arrangement within the panel 950. One reason such a panel 950 is preferred is that the numerous parallel air passageways will tend to produce laminar airflow in the emerging air currents. The instant inventors have determined that reducing the amount of turbulence in the air that is expelled from the Fresnel fixture is an important factor in reducing the amount of noise generated by the instant invention. In the preferred operating environment of the instant invention quiet operation of the cooling system utilized by this invention is important because noise that is generated by fans or other cooling mechanisms can often be heard on microphones that are positioned nearby.

As is generally suggested in FIG. 9, the LED engine will preferably be placed ahead of the fan 945, i.e., the fan will draw air though its cooling arms 315 and expel that air toward the rear of the fixture. In some embodiments, the fan 945/LED engine 300 will be mounted together on the Fresnel light socket 1110. In other instances, the fan 945 might be separately mounted somewhere in the interior of the fixture, although it will preferably be mounted toward its back.

It should be also noted that in some preferred embodiments the liquid-based cooling system might be replaced by or augmented with one of more Peltier modules, a Peltier module being a device that utilizes one or more thermocouples to create a cooling effect according to methods well known to those of ordinary skill in the art. Thermocouples are widely used in science and industry for both temperature measurement and temperature control. Broadly speaking, the thermocouple effect is based on the observation that in certain circumstances a temperature differential can be converted directly into electrical energy, with the amount of electrical energy so generated providing an estimate of the temperature. Conventional thermocouples are often formed by joining together a pair of dissimilar metal wires (e.g., the metals having been chosen so that a voltage is observed depending on the size of the temperature difference between the joined and free ends of the pair). The observed voltage (which might be several µV per degree Celsius of observed temperature difference) then provides an estimate of the temperature differential along the length of the pair of wires according to standard equations well known to those of ordinary skill in the art.

Conversely, if a voltage is applied to a thermocouple a temperature differential is created between the junction and the free ends of the two elements that comprise the thermocouple, with the junction being either cooled or heated depending on the direction of the applied DC current. If a number of such thermocouples are interconnected, a heating and cooling module (e.g., a Peltier module) may be constructed according to methods well known in the art. Several thermocouples that have been interconnected in series are often also commonly referred to as a thermopile.

In operation, a Peltier module might be affixed, removably attached, or otherwise placed in thermal communication with heat sink 330 (e.g., by attaching same to the front or back of the heat sink 330 proximate to the LED assembly 320). Then, by passing a current of the appropriate polarity through the Peltier module a cooling effect at the heat sink 330 will be generated, with the heat being transferred away from the heat sink 130 to a location, say, outside of the fixture where it can be dissipated.

It should be noted that the preferred design of the invention described herein is that it makes for a very quiet cooling operation. This provides a means of enhancing the heat transfer between the finned heat exchange members 310 and air as it passes therethrough.

In order to determine what type of power and dimming system is providing power to the inventive system, its control circuit will preferably monitor the input voltage to determine, for example, whether it is AC or DC, and what type of dimming system has been employed. Under certain conditions, the control circuit could possibly be temporarily fooled so it might also be desirable to have voltage input selection setting switches. For example, when the instant invention is situated in 230 volt countries the switch would be set to 230, when in 120 volt countries then a setting for that, and when used in Japan the setting would 100V. In a preferred embodiment, the electronics will be able to handle any of these voltages without harm or prompting, but the dimming level might initially not be representative of what was requested. For example, if a Variac dimmer were used in Europe and was dimmed to near 120 volts AC when the unit was powered up, it would think it was in North America until the voltage reached about 130 volts AC at which time it would suddenly realize that it was in a higher voltage country and the dimming scheme would shift to that of a 230 volt scenario, dropping the output of the LED engine to 56% brightness because 130 VAC is 56% of 230 VAC.

Similarly if the same unit in the same conditions were on a Triac or other thyristor dimmer, then according to one embodiment of the inventive system it might be desirable to: 1) determine the frequency of the input power by sensing the time between consecutive zero crossings (i.e. 60 Hz for the U.S. or 50 Hz for Europe); 2) sense the delay from a zero crossing to the Triac turn-on to determine the phase angle; 3) measure the voltage at turn-on and mathematically determine peak voltage from the value read and the phase angle; 4) calculate the RMS voltage of the switched waveform and the resulting proportion of the un-switched RMS input voltage; and, 5) drive the LED to produce the appropriate amount of light under the dimming conditions. When used on a Variac the system will preferably calculate the RMS input voltage and use this information to determine at what brightness level to set the LED engine. The same control circuit would preferably be able to see that the incoming voltage might not be a sine wave, e.g., it might be DC, and would then simply dim the output in proportion to the input DC voltage.

The power supply for the output portion could be the same as that used to power the control circuit if it could be made to self-start at low voltages such as, for example, 30 volts.

Most high-power off-the-shelf switching power supplies have a low voltage lockout because they could be damaged by trying to provide a full and high wattage output while being fed by a very low input voltage. The inventive bulb replacement system will preferably use switching power supplies which would have this low voltage lockout removed because the logic of the control circuit would only allow small amounts of current to flow to the LED engine while the supply voltage is low which in addition to being an accurate brightness output for this voltage also protects the power supply in this situation.

In summary, and preferably, the light output of the converted fixture will accurately track, at least proportionately, the output of the unconverted fixture equipped with a conventional light bulb under like input conditions.

A fan operating at laminar speeds could also be powered by the high-power section of power supply. The fan wouldn't be needed at the very lowest LED output levels but might be needed at higher levels and this power economy would allow the power supply to use all of its output to feed both the control circuit and the LED at the lowest possible input voltages.

The existing heavy Pyrex® Fresnel lens is likely not optimized for the inventive LED engine and ideally it would be replaced with an optimized plastic Fresnel lens and a light shaped diffuser filter.

The same inventive fixture that uses existing dimmer systems could also provide a built in dimmer which would eliminate the need for taking additional equipment on location. Effectively the inventive product will preferably already have a built in dimmer and will simply need an external potentiometer or some other communication means in order for the internal dimmer to be controlled by the operator in a way other than by a dimming AC power system. Because it will have a universal power supply internally, the combination of the old fixture housing and inventive bulb replacement could easily travel from country to country with no regard as to which voltage it would encounter in each.

Existing fixtures are designed to allow air in and out from most areas of the fixture, the front, bottom sides, back, and top are all perforated or slotted because they were designed to let out nearly 10 times the amount of heat generated by the inventive system and they did so using mostly convection. In some embodiments of the instant invention, it will be necessary to separate the air that is in front of the heat sink from air within the fixture that is behind it. The LED engine will preferably utilize a prophylactic barrier between the incoming cool air and the warmer air that is discharged from the back of heat sink. Air will preferably be drawn in from the front of the fixture and discharged to the back because these sorts of lights are generally tilted down and, in that orientation, convection will best assist the actively cooled system in exchanging air.

Figure 12:
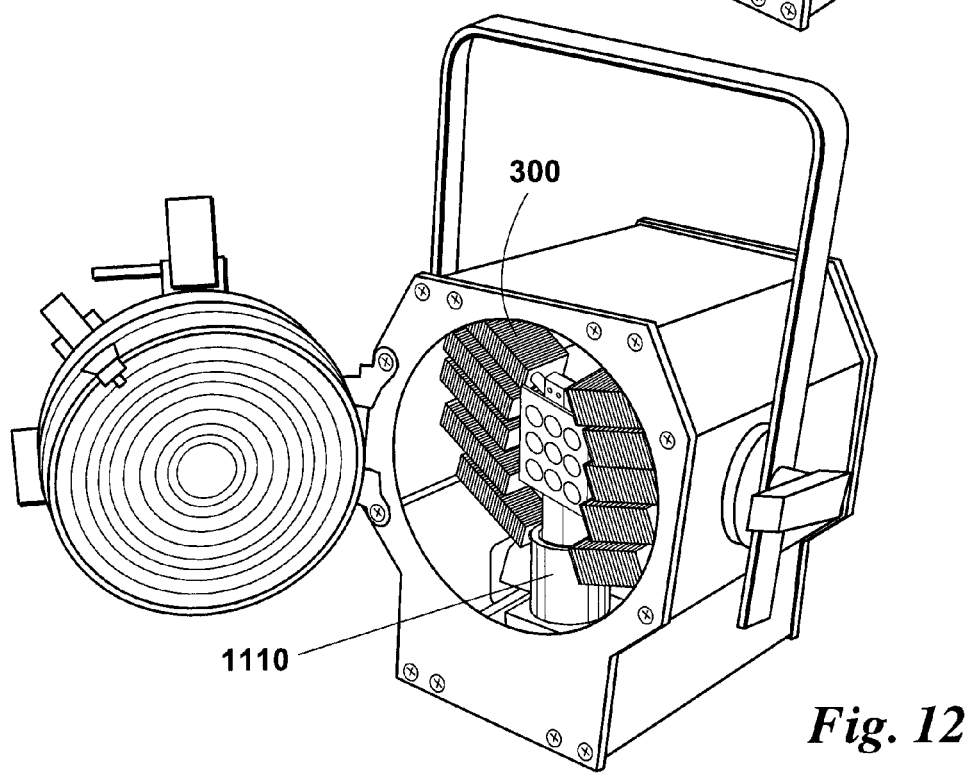
FIG. 12 contains a schematic illustration of how a preferred embodiment of the instant invention might be installed within an existing globe plug.
Figure 13:
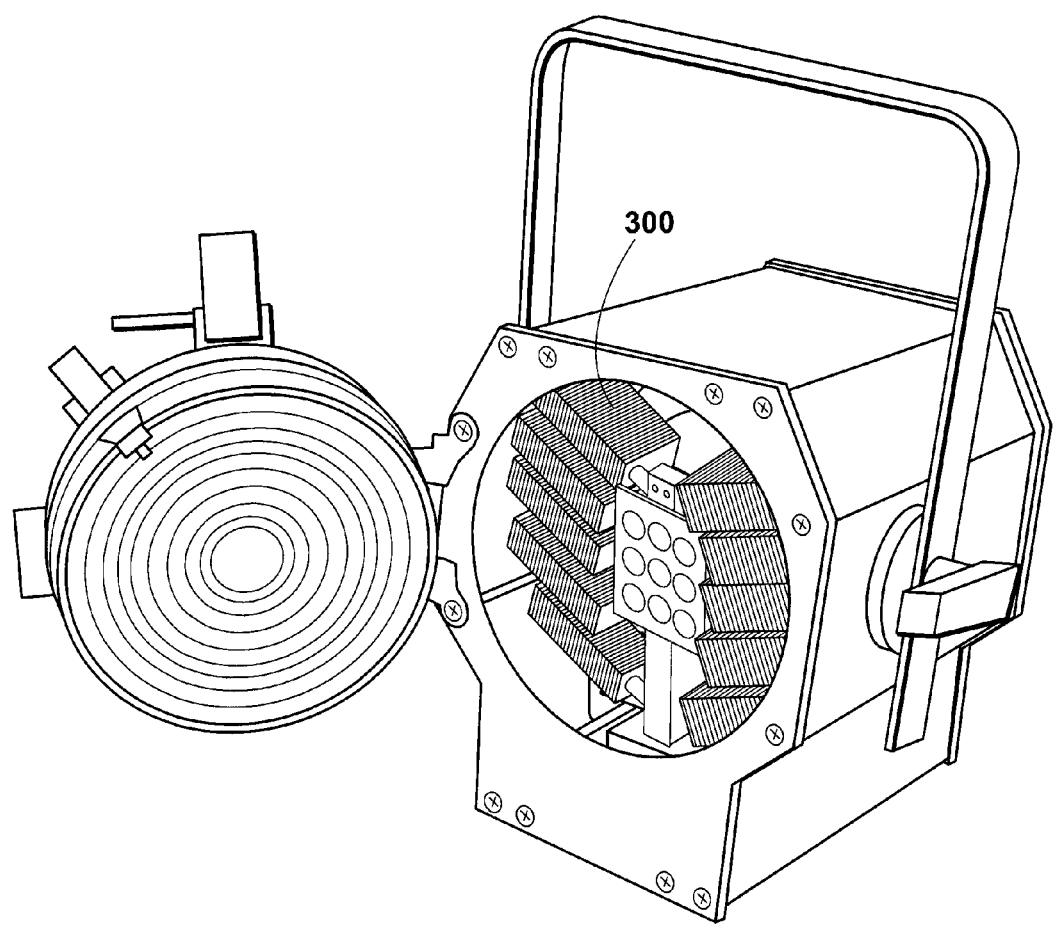
FIG. 13 contains a schematic illustration of how another preferred embodiment of the instant invention might appear if the globe socket were removed and the LED engine were to be mounted directly to the focus rail(s).

Finally, FIGS. 12 and 13 illustrate how the instant invention might be mounted in practice within a Fresnel fixture. Turning first to FIG. 12, in this embodiment the LED engine 300 has been mounted atop the conventional globe socket 1110 which, in turn, is designed to be movable within the fixture via focus rails (not shown) as has been discussed previously. Power for the LED engine 300 is provided via the socket's 1110 electrical circuitry. In the preferred arrangement, the electrical contacts 395 (not shown in this figure) of the LED engine 300 will be positioned to mate with corresponding receptacles within the socket 1110, thereby providing a source of electrical power to the LED engine.

In some embodiments, the globe socket 1110 will be removed from the fixture and the instant LED engine 300 will instead be mounted on the slider or other structure by which the socket 1110 is moved within the Fresnel housing. The electrical connections that previously supplied power to the socket 1110 will then be used directly to power the instant LED engine 300.

It should be noted for purposes of the instant invention that when it is said that one element is "mounted" on another, that term should be broadly construed to include instances where one element is directly attached to the other, as well as instances where the two elements are in mechanical communication with each other but where one or more other elements might intervene, e.g., where one element is affixed to another that is, in turn, directly attached to a third element.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed:

1. A focusable Fresnel lighting fixture, comprising:
   a housing;
   a Fresnel lens supported by said housing;
   a globe socket within said housing, said globe socket adapted to receive a globe therein; and,
   an LED engine capable of projecting light including:
   a plug mechanically compatible with said globe socket such that, when said plug is affixed in said globe socket, said said LED engine is affixed at a position optically required by said focusable Fresnel lighting fixture,
   wherein all of the electrical power used by said LED engine is supplied through said plug;
   a heat sink for dissipating heat produced by said LED engine into the environment;
   a fan for drawing air past said heat sink.

2. A method for converting an incandescent focusable Fresnel fixture having a housing and an incandescent globe socket to an LED Fresnel fixture, the method comprising:
   (a) obtaining an LED engine, said LED engine being plug compatible with the incandescent globe socket,
   said LED engine including one or more LEDs each capable of projecting light with a tungsten color temperature or a daylight color temperature suitable for projecting light for proper illumination for image capture for film, video, or photography and a heat sink in thermal communication with said one or more LEDs for communicating heat produced by said one or more LEDs into the environment;
   (b) providing a fan in said housing capable of drawing air past said LED engine;
   (c) installing said LED engine in said incandescent globe socket; said LED engine including a plug that is mechanically compatible with said globe socket such that said light is projected by said LED engine at a position optically required by said focusable Fresnel fixture.

3. A method for converting an incandescent focusable Fresnel fixture having a housing, Fresnel lens, globe socket, reflector, and at least one focus rail to an LED Fresnel fixture, the method comprising:
(a) removing said reflector;
(b) obtaining and LED engine capable of projecting light therefrom along a first axis;
(c) providing a control input for selectively controlling an illumination level of said projected light;
(d) providing a fan for cooling said LED engine by drawing air past said LED engine;
(e) said LED engine having a non-rotatable electrical connection extending along a second axis wherein said first axis is substantially perpendicular to said second axis;
(f) mounting said LED engine in the housing and connecting said non-rotatable electrical connection to said globe socket such that said LED engine is at a position such that light projected from said LED engine is directed through the Fresnel lens;
(g) wherein said LED engine is capable of adjustment in association with said at least one focus rail.

4. An improved Fresnel fixture of the type having an incandescent globe socket, said improvement comprising an LED engine capable of projecting light along an axis; said LED engine including one or more LEDs each capable of projecting light with a tungsten color temperature or a daylight color temperature; said LED engine having a non-rotatable electrical connection extending along an axis; said electrical connection being compatible with said globe socket such that when connected, the axis of the light projected by said LED engine is perpendicular to the axis of said electrical connection and emitted by said LED engine at a position optically required by said Fresnel fixture; and a fan capable of drawing air past said LED engine.

5. The LED device according to claim 4, wherein said plug compatible electrical connection further comprises an electrical adapter in electrical communication with said LED engine and said globe socket.

6. An LED device suitable to provide proper illumination for image capture for film, video, or photography, comprising:
(a) an LED engine capable of projecting light along an axis;
(b) said LED engine including at least one LED element capable of projecting light with a tungsten color temperature or a daylight color temperature suitable to provide proper illumination for image capture for film, video, or photography for use with a focusable Fresnel fixture, including a Fresnel lens;
(b) focus rails for adjusting the distance between said LED engine and said at least one Fresnel lens;
(c) said LED engine having a non-rotatable electrical connection extending along an axis;
(d) said electrical connection being plug compatible with said focusable Fresnel fixture so as to hold said LED engine such that said light is projected by said LED engine at a position optically required by said focusable Fresnel fixture;
(e) said LED engine including a fan capable of forcing air past said LED engine.

7. An LED device suitable for image capture according to claim 6, wherein said Fresnel fixture has globe socket and said LED engine is plug compatible with said globe socket.

8. The lighting system of claim 6 wherein said LED engine includes an array of high power LEDs.

9. The lighting system of claim 6 wherein said fan produces a laminar flow of air past said LED engine.

10. The lighting system of claim 6 wherein said LED engine includes a heat sink such that said fan forces air across said heat sink.

11. The lighting system of claim 10 wherein said heat sink includes a plurality of fins such that said fan forces air across said plurality of fins.

12. The lighting system of claim 10 wherein said LED engine includes at least one heat pipe for active cooling.

13. The lighting system of claim 12 wherein said at least one heat pipe contains a liquid therein.

14. The lighting system of claim 13 wherein said LED engine includes at least one pump for pumping said liquid through said at least one heat pipe.

15. The lighting system of claim 6 wherein said fan operates at a speed, a tachometer for measuring said speed and further including a control input for selectively controlling the speed of said fan.

16. The lighting system of claim 15 wherein said control inputs may be controlled remotely.

17. An LED lamp for replacing an incandescent bulb for use in a focusable fixture having a Fresnel lens, the fixture suitable to provide proper illumination for image capture for film, video, or photography, comprising:
(a) an LED engine capable of projecting light along a first axis, said LED engine including:
  (i) a planar array of LED elements each capable of projecting broad spectrum light;
  (ii) a base having a non-rotatable electrical connection extending along a second axis perpendicular to said first axis,
    wherein said base is plug-compatible with the incandescent bulb such that when the LED lamp is installed in the Fresnel fixture, said planar array of LED elements is fixed at a position optically required by the Fresnel lens, and
    wherein said electrical connection supplies all electrical power and signals used by said LED engine;
  (iii) a heat sink supported by said base, said heat sink in thermal communication with said planar array of LED elements for communicating heat produced by the LED elements into the environment; and
  (iv) a fan for discharging air heated by said heat sink from the focusable fixture.

18. The LED lamp of claim 17 wherein said light projected along said first axis has an intensity and wherein said LED engine varies said brightness in response to the RMS voltage of said electrical power.

* * * * *